United States Patent
Gukal

(10) Patent No.: US 9,965,550 B2
(45) Date of Patent: May 8, 2018

(54) ESTIMATING FULL TEXT SEARCH RESULTS OF LOG RECORDS

(71) Applicant: CA, INC., Islandia, NY (US)

(72) Inventor: Sreenivas Gukal, Santa Clara, CA (US)

(73) Assignee: CA, Inc., Islandia, NY (US)

(*) Notice: Subject to any disclaimer, the term of this patent is extended or adjusted under 35 U.S.C. 154(b) by 857 days.

(21) Appl. No.: 14/323,499

(22) Filed: Jul. 3, 2014

(65) Prior Publication Data

US 2016/0004769 A1  Jan. 7, 2016

(51) Int. Cl.
*G06F 17/30* (2006.01)
*G06F 7/00* (2006.01)

(52) U.S. Cl.
CPC .. *G06F 17/30696* (2013.01); *G06F 17/30628* (2013.01); *G06F 17/30657* (2013.01); *G06F 17/30678* (2013.01)

(58) Field of Classification Search
CPC ......... G06F 17/30864; G06F 17/30616; G06F 17/30011; G06F 17/2705; G06F 17/272
USPC ....................................................... 707/730
See application file for complete search history.

(56) References Cited

U.S. PATENT DOCUMENTS

| | | | |
|---|---|---|---|
| 2002/0021234 A1* | 2/2002 | Yanagiya | H03M 7/4006 341/107 |
| 2012/0084287 A1* | 4/2012 | Lakshminarayan | G06F 17/30469 707/737 |
| 2014/0089290 A1* | 3/2014 | Jackson | G06F 17/30864 707/711 |
| 2014/0324862 A1* | 10/2014 | Bingham | G06F 17/30572 707/737 |
| 2015/0089522 A1* | 3/2015 | Volovich | H04N 21/25891 725/14 |

* cited by examiner

*Primary Examiner* — Usmaan Saeed
*Assistant Examiner* — Raquel Perez-Arroyo
(74) *Attorney, Agent, or Firm* — Sage Patent Group

(57) ABSTRACT

A method by a computer includes receiving a search query from a user equipment, where the search query defines a logical combination of terms to be searched within a defined interval of records of a log stream. An estimate is generated for the number of occurrences of the logical combination of terms in the defined interval of records. A message containing the estimate for the number of occurrences of the logical combination of terms in the defined interval of records is communicated toward the user equipment.

18 Claims, 4 Drawing Sheets

ESTIMATING FULL TEXT SEARCH RESULTS OF LOG RECORDS

TECHNICAL FIELD

The present disclosure relates to computer systems and more particularly to analysis of records of log streams generated by computer equipment.

BACKGROUND

Data centers can contain thousands of servers (both physical and virtual machines), with each server running one or more software applications. The servers and software applications generate log stream records to indicate their current states and operations. For example, software applications may output log records that sequentially list actions that have been performed and/or list application state information at various checkpoints or when triggered by defined events (e.g., faults) occurrences, etc.

These log records are stored and searched by systems operators for various purposes—e.g., to detect anomalies, troubleshoot problems, mine information, check the health of the servers etc. The log records can be generated on the order of millions per second in large data centers. In existing processes, the log records are stored in a full-text index (FTI). An FTI allows complex text queries to be performed on the log records.

Operators typically perform iterative full-text queries on the FTI of log records. When an operator's query returns an excessive number of content rows of log records, the operator discards the results (wasting system resources that ran the query) and reissues the query with additional restrictions. Full-text queries of the FTI of log records consume significant processing resources and time, and the burden on the associated computer system increases with the number of search iterations.

SUMMARY

Some embodiments disclosed herein are directed to a method by a computer. The method includes receiving a search query from a user equipment, where the search query defines a logical combination of terms to be searched within a defined interval of records of a log stream. An estimate is generated for the number of occurrences of the logical combination of terms in the defined interval of records. A message containing the estimate for the number of occurrences of the logical combination of terms in the defined interval of records is communicated toward the user equipment.

Some other embodiments disclosed herein are directed to a computer program product that includes a computer readable storage medium having computer readable program code embodied therewith. The computer readable program code includes computer readable program code to receive a search query from a user equipment. The search query defines a logical combination of terms to be searched within a defined interval of records of a log stream. Further computer readable program code generates an estimate for the number of occurrences of the logical combination of terms in the defined interval of records, and communicate toward the user equipment a message containing the estimate for the number of occurrences of the logical combination of terms in the defined interval of records.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
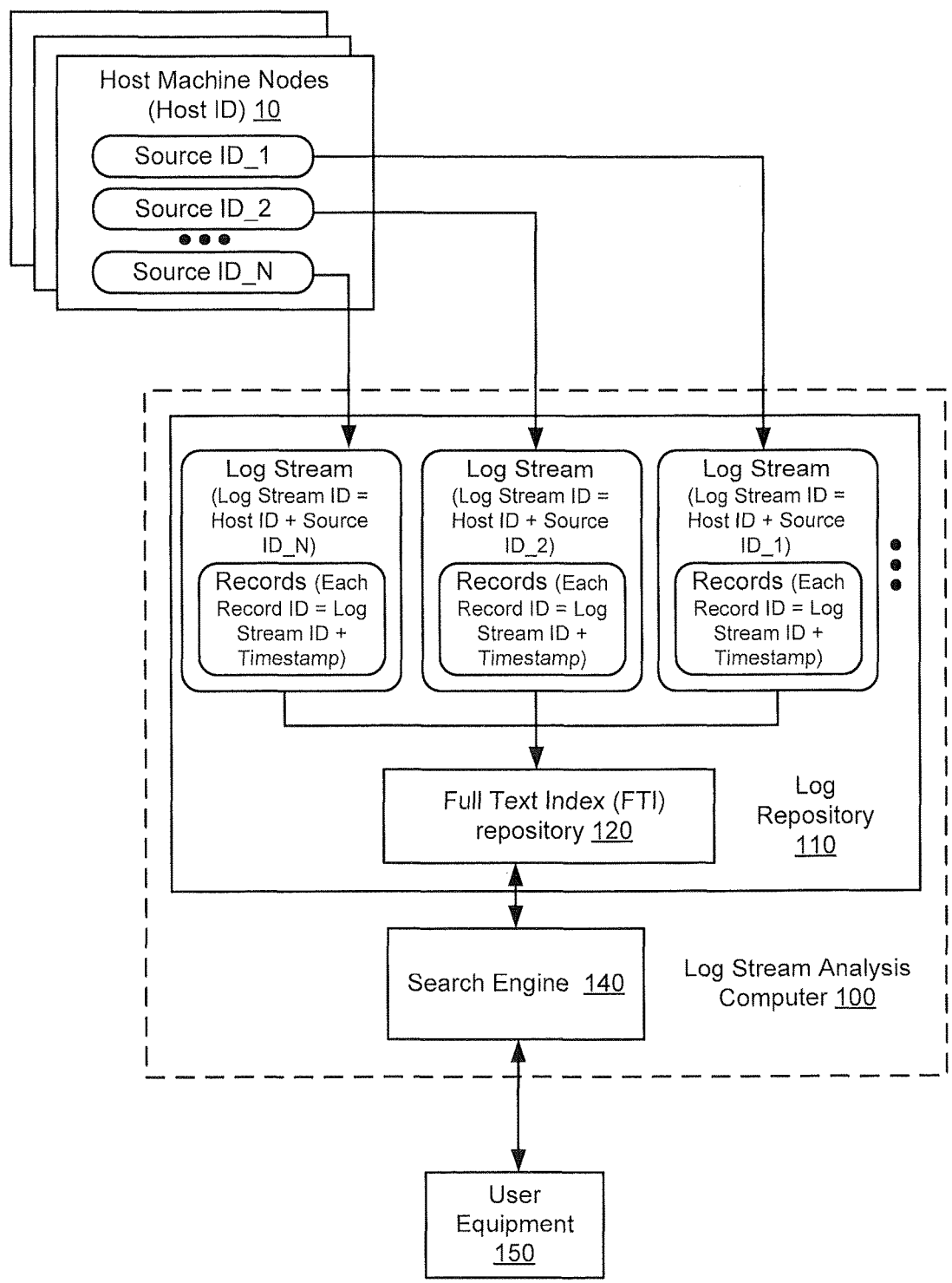
FIG. 1 is a block diagram of a system containing a log stream analysis computer that generates estimates for results of queries on log streams generated by software sources executed by host nodes, in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives log streams from N different software sources (identified as Source ID_1, Source ID_2, . . . Source ID_N) executed by the host machine node 10 identified by a Host ID, and can further receive log streams from other software sources executed by other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state nonvolatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID.

In the embodiment of FIG. 1, one software source executed by the host outputs a log stream uniquely identified (Log Stream ID) as a combination of an identifier of the host (Host ID) and an identifier of the software source (Source ID_1). Another software source executed by the host outputs a log stream uniquely identified (Log Stream ID) as a combination of an identifier of the host (Host ID) and an identifier of the software source (Source ID_2). Similarly, a N'th software source executed by the host outputs a log stream uniquely identified (Log Stream ID) as a combination of an identifier of the host (Host ID) and an identifier of the software source (Source ID_N). Other hosts would be identified by different Host IDs.

The log stream analysis computer 100 partitions the received log streams into corresponding records according to a defined time interval (e.g., a defined number of minutes or hours) or other defined event or rule. The records are stored in a log repository 110 (e.g., mass data storage devices such networked servers). Each record may be uniquely identified by an identifier (Record ID) that is formed from a combination (e.g., concatenation) of the corresponding (Log Stream ID) from which the record was partitioned and a timestamp associated with the defined time interval or other defined event or rule. The interval size can be determined based on a trade-off analysis between storage space requirements and accuracy.

A search engine 140 is provided that allows a user, via user equipment 150 (e.g., desktop computer, laptop computer, tablet computer, smart phone, etc.), to perform full text searches of content of the log stream records. In a full-text search, a search engine can examine all of the terms (e.g., words or other text) in every stored record as it tries to match search criteria (e.g., text keywords) specified by an operator (or other user) in a search query. However, because of the large number of records that can be generated in data centers and many other environments and the potential large number of search queries that can be concurrently performed (e.g., based on search queries from numerous user equipment 150), a full-text search of all terms in every stored record would consume excessive computational resources of the search engine 140 and require excessive time to perform.

To improve the searching efficiency and timeliness, a full text index (FTI) repository 120 scans the terms of all records and builds an index that identifies unique terms (e.g., characters, words, phrases, strings, etc) contained in identified records, and updates the index responsive to the content of incoming log streams. The FTI repository 120 may employ language-specific stemming on the terms being indexed. For example, the words "drives", "drove", and "driven" can be recorded in the index under the single term "drive."

In the search stage, the search engine 140 may perform a full-text query by referencing the index rather than the full-text of the original records to improve the efficiency and speed of searching.

However, when an operator's query returns an excessive number of items (e.g., rows) of the log records, the operator discards the results (wasting system resources that performed the query) and reissues the query with additional restrictions. Full-text queries of the FTI repository 120 consumes significant processing resources and time, and the burden on the associated search engine 140 and log repository 110 increases with the number of search iterations.

In accordance with at least some embodiments disclosed herein, the search engine 140 is configured to process the log to characterize records in the log repository 110 using one or more of histogram characterization of the occurrence of unique terms contained in the records, min-wise independent permutation locality sensitive hashing (MinHash) characterization of the occurrence of unique terms contained in the records, and bit array characterization of the occurrence of unique terms contained in the records. The search engine 140 can select among the different types of characterizations it will generate for different terms contained in the records based on how often the respective terms occur in those particular records. The search engine 140 can then respond to a full text query from a user equipment 150 by using values that were earlier stored from the generated characterizations to generate an estimate of the number of record items that would be returned by individual terms in a query, by logical combinations of terms in a query, and/or by the entire query if the query were performed as a full text query of the records. Importantly, the search engine 140 generates the estimate without running the full text query through all content of the records. This approach may substantially reduce the amount of system resources (e.g., computational processing, data storage, and/or network bandwidth utilization) consumed by each search iteration and provide an operator with information that enables the operator to more intuitively modify a next query based on the estimated results of a previous query to retrieve an acceptable number of items (e.g., rows) of the log records.

The estimates can be generated for individual terms and/or for groups of terms (e.g., defined Boolean logic combinations of terms) that are identified in a full text query received from the user equipment 150. Thus, for example, a full text query having 10 unique terms can result in the search engine 140 returning a message to the user equipment 150 that identifies an estimate of how many record items (e.g., rows) will be retrieved by each of the 10 unique terms when run as a full text query against the records. The message may furthermore identify an estimate of how many record items will be retrieved by logical combinations of the terms (e.g., defined Boolean or other logical combinations of terms) that are defined by content of the full text query received from the user equipment 150.

An operator of the user equipment 150 can understand from the estimates how to modify the full text query so that it will return what the operator considers to be an acceptable number of record items (e.g., rows). Once the operator is satisfied with the number of record items (e.g., rows) returned by a modified full text query, the operator can cause the search engine 140 to perform the modified full text query against the FTI 120 to generate the full text query result set (containing the record items (e.g., rows)) that satisfy the modified full text query.

The search engine 140 can alternatively or additionally use the estimates to control operations that are performed to carry out the full text query. For example, the search engine 140 may use the estimates to select an order by which the search terms are used to perform a full text search. For example, the search engine 140 may select which terms or logical combination of terms should be used for a full text search of the records before other terms or logical combinations of terms are used to search among the results of the earlier search in order to more efficiently narrow search operations through the records.

In accordance with some embodiment, the estimates are generated using the following operations:
1) Bloom filter operations are used to quickly evaluate terms of a query;
2) Histogram operations are used to estimate the number of occurrences of each term in a query; and
3) MinHashes and Bit-arrays of selective terms are used to determine correlations between query terms.

Processing Records of the Log Streams

Figure 2:
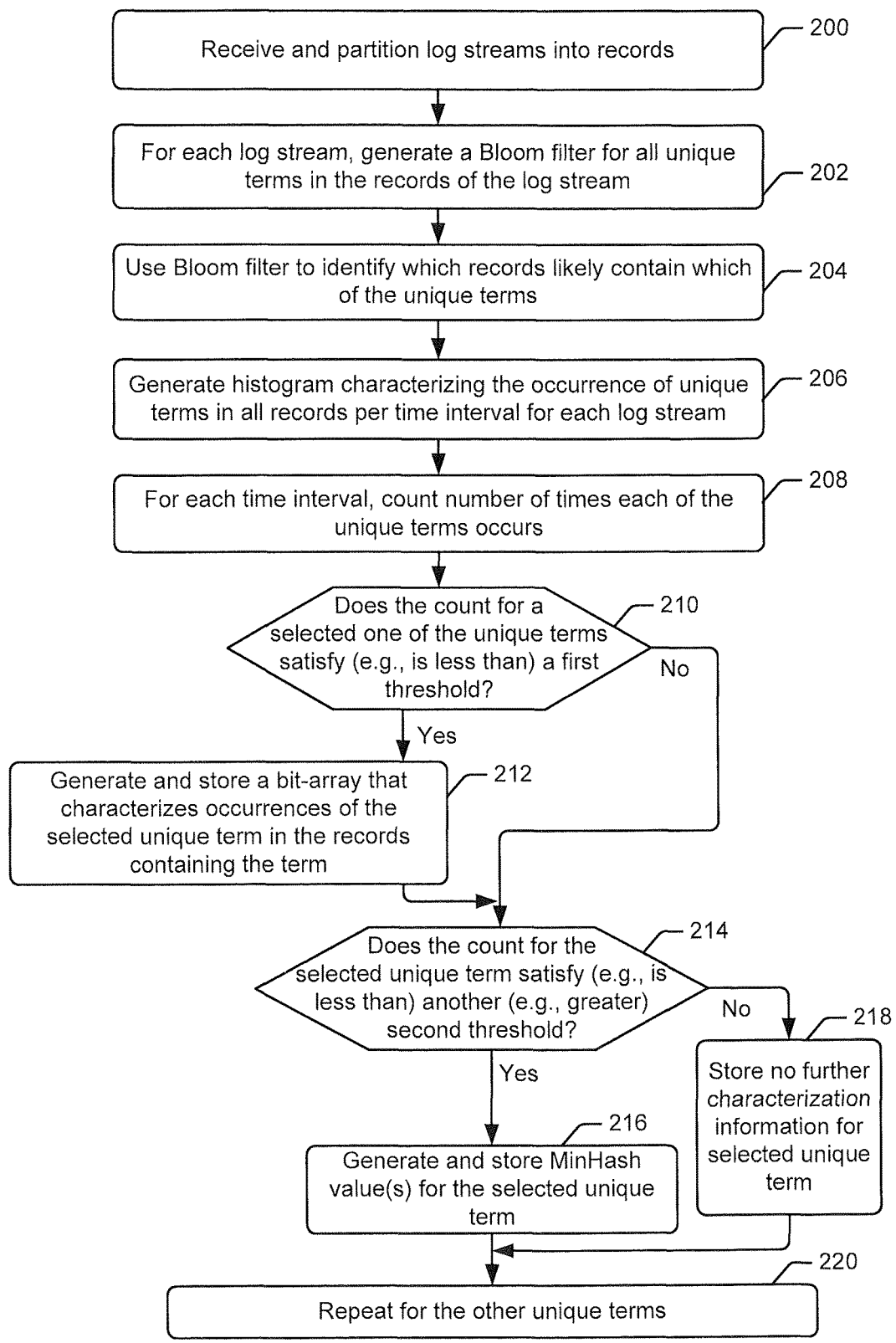
FIG. 2 is a flowchart of operations by a log stream analysis computer for processing log streams to generate information characterizing occurrence of terms therein for later use in generating estimates of the likely result of a search query, in accordance with some embodiments.

FIG. 2 illustrates operations that may be performed by the search engine 140 and/or another component of the log stream analysis computer 100 to generate histogram characterizations of terms contained in the records, MinHash characterizations of terms contained in the records, and/or bit array characterizations of terms contained in the records are explained below with reference to FIG. 2, in accordance with some embodiments. Referring to FIG. 2, as explained above, log streams are received from software sources and/or host machine nodes 10 and are partitioned (block 200) into records according to a defined time interval (e.g., a defined number of minutes or hours), range, or other defined event or rule. The records are stored in memory devices of a log repository 110 (e.g., mass data storage devices such as servers).

For each log stream, the search engine 140 generates (block 202) one Bloom filter for all the terms in all the records in the log stream for each time interval (or defined range, etc.). Thus, in one embodiment, the search engine 140 builds N Bloom filters for N log streams, where N is a positive integer. The Bloom filter is built as a probabilistic data structure that indicates set membership between the records. False positive matches are possible, but false negatives are not, thus a Bloom filter has a 100% recall rate. In other words, a query of one of the Bloom filters returns an indication that a term defined by a search query is "possibly in a log stream" or "definitely not in a log stream". The Bloom filter size is defined based on the number of unique terms that have been identified in the log stream. In one embodiment, the size of the Bloom filter, once defined, remains the same for all time intervals for that log stream.

The search engine 140 uses the Bloom filter to identify (block 204) which records likely contain, or likewise certainly do not contain, which of the unique terms. Using the Bloom filter, the search engine 140 can determine which computational efficiency which records are to be further processed to generate and save characterization information for particular terms for subsequent use in generating estimates responsive to those terms appearing in full text queries or other search queries received from the user equipment 150 and/or other components of a system.

The search engine 140 generates (block 206) a histogram (e.g., a single histogram) characterizing occurrence of all of the unique terms (e.g., all defined terms or terms satisfying a defined rule(s)) in all the log records per defined time interval (or defined range, etc.) for each log stream. The search engine 140 uses the Bloom filter to determine which of the log streams and/or records possibly contain which of the unique terms and, thereby, should be searched for occurrences of those unique terms to generate the data for the histogram. Thus, in one embodiment, the search engine 140 builds N histograms for N log streams, where N is a positive integer. The histogram is built as a data structure that indicates the distribution of the unique terms in each of the log streams. In the histogram, the unique terms are arranged sequentially and grouped into consecutive, non-overlapping defined time intervals (or defined ranges, etc.), and the counts for the time intervals (densities) are stored in memory for later reference by the search engine 140. For each time interval, the histogram may contain information indicating two counts: 1) the number of occurrences of each of the unique terms in the time interval; and 2) the total number of occurrences of all those unique terms in the time interval.

The type of operations and resulting information to characterize occurrences of particular ones of the terms in particular records and/or to characterize correlations between occurrences of particular terms in particular records that is saved for later use in generating estimates for the particular ones of the terms, is selected depending upon how often the particular ones of the terms occurs in the records.

Accordingly, for each defined time interval (or defined range, etc.), the number of times each of the unique terms occurs in the records associated with the time interval is counted (block 208).

Information that identifies correlations between occurrences of particular terms in particular records can be generated using MinHashes and/or bit-arrays. The search engine 140 can select among using MinHash and/or bit-array operations for generating the information characterizing occurrences of a selected one of the unique terms, based on whether the associated count for the unique term satisfies one or more threshold values.

In one embodiment, three rules are defined that control the amount of correlation information relating to a term that is saved. The rules can include:
1) For a term that occurs in more than a first threshold amount (e.g, 80%) of the records, neither MinHash nor bit-arrays are generated or saved for later use in generating an estimate(s) for the term;
2) For a term that occurs in less than the first threshold amount (e.g., 80%) of the records; MinHash is generated for the term and stored for later use in generating an estimate(s) for the term;
3) For a term that occurs in less than a second threshold amount (e.g., 10%) of the records, a Bit-array (e.g., having 1 indicator bit per record) and MinHash are generated for the term and stored for later use in generating an estimate(s) for the term.

In the example of FIG. 2, a determination is performed (block 210) for whether the count for a selected one of the unique terms satisfies (e.g., is less than) a first threshold. If satisfied, a bit array is generated and stored (block 212) in memory which characterizes occurrences of the selected unique term in the records.

If the determination is not satisfied (block 210), a further determination is performed (block 214) for whether the count for the selected unique term satisfies (e.g., is less than) a second threshold that is different than (e.g., greater than) the first threshold. If the second determination is satisfied (block 214), one or more MinHash values are generated and stored (block 216) in memory which characterizes occurrences of the selected unique term in one of the records and/or between the records. If the second determination is not satisfied (block 214) the operations may proceed to block 220 without generating or storing (block 218) further characterization information for the selected unique term.

The operations of block 210 through 218 can be repeated (block 220) for each of the other unique terms.

The rules and number of thresholds can be defined differently in other embodiments to adjust the type and/or amount of information characterizing occurrences of each of the unique terms in records and/or streams that is saved for later use in generating estimates, and may be defined before operation and further re-defined or adjusted during operation based on existing or projected amounts of system resources (e.g., storage capacity) that is used to store the characterization information.

One potential objective may be to save more detailed information for terms that are defined or determined to be of higher importance than other terms for each interval. MinHashes are small data structures. The bit-arrays are very sparse (e.g., when the terms occur in less than 10% of the record items, such as rows) and hence can be significantly compressed. The Bloom filters, histograms, bit-arrays and MinHashes can be saved as entries in a table, where the entries can be associated with (indexed by) identified ones of the log streams and identified ones of the time intervals.

Determining Estimates

Figure 3:
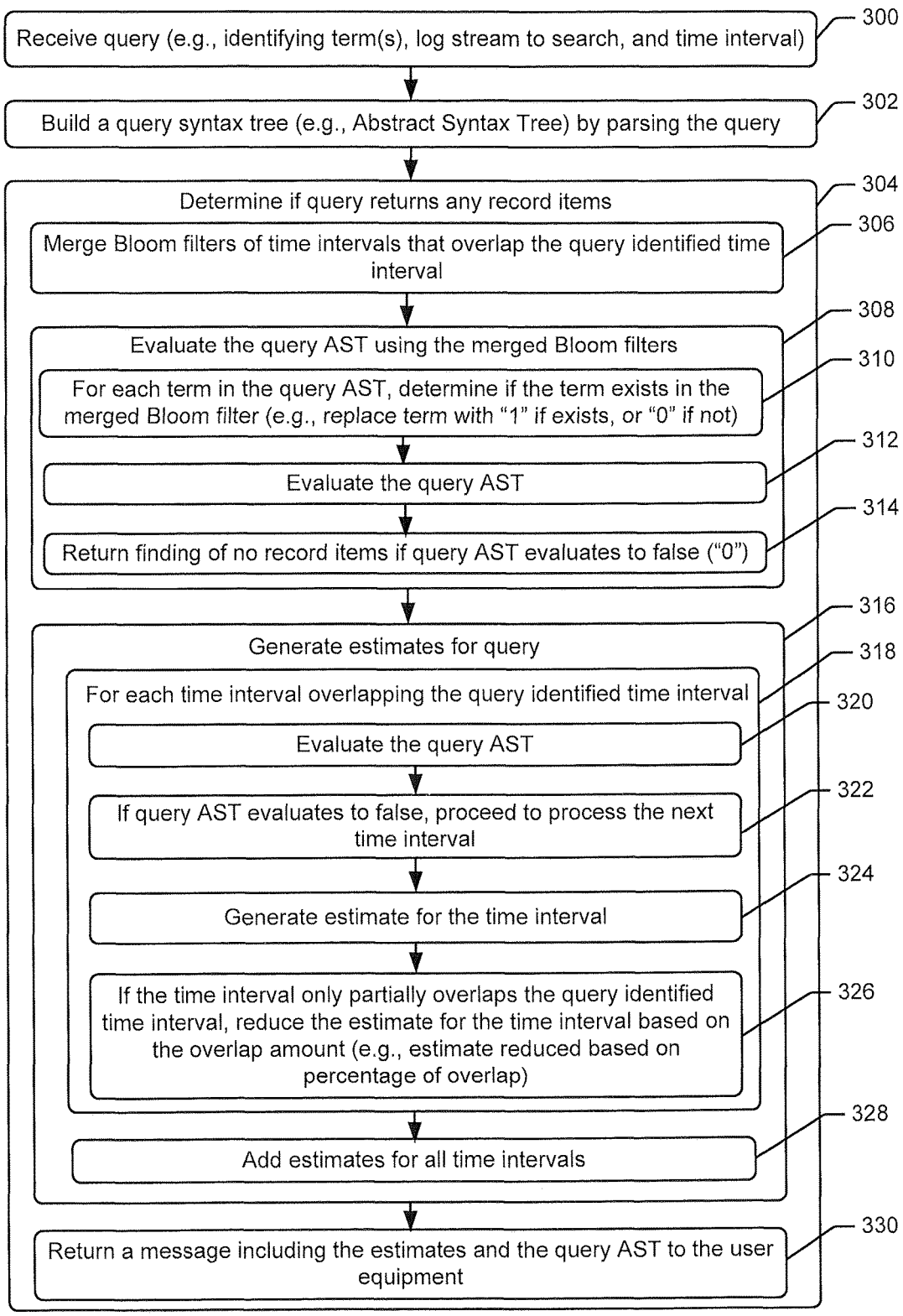
FIG. 3 is a flowchart of operations by a log stream analysis computer for generating estimates of the likely result of a search query using the information generated in FIG. 2 characterizing occurrence of terms, in accordance with some embodiments.

Operations that may be performed by the search engine 140 or another component of the log stream analysis computer 100 for estimating the number of record items (e.g., rows) that are associated with (e.g., and would be retrieved responsive to) a defined query are explained below and illustrated in FIG. 3. Referring to FIG. 3, a query is received (block 300) from a user equipment 150. The query can contain information identifying one or more terms that are to be searched and may further identify Boolean or other logic associations that are to be searched between the terms, information identifying one or more log streams that are to be searched to obtain record items (e.g., rows) satisfying the one or more terms and Boolean or other logic associations between particular terms, and information identifying a time interval, defined range, or other information that can be used to identify which of the records are to be searched.

A syntax tree, such as an Abstract Syntax Tree (AST), is built (block 302) by parsing content of the query. A determination (block 304) is made using, for example, the Bloom filters as to whether the query returns any record items. The Bloom filters of time intervals that overlap the query identified time interval are merged (block 306). The query AST is evaluated (block 308) using the merged Bloom filters. For each unique term in the query AST, operations are performed to determine (block 310) if the unique term exists in the merged Bloom filters. The operations may, for example, selectively modify the merged Bloom filters by replacing the unique term with a logic "1" value if the term exists in the merged Bloom filters or replace the unique term with a logic "0" value if the term does not exist in the merged Bloom filters. The query AST is evaluated (block 312) based on the modified merged Bloom filters to determine whether the query returns any record items. If the query AST indicates that no record items contain the terms contained in the search query, a message is returned (block 314) to the user equipment 150 indicating an estimate of 0 record items corresponding to the search query.

If the query AST indicates that at least one record item contains the terms contained in the search query, operations continue by sequentially generating (block 316) an estimate of the number of record items that correspond to each unique term defined by the query and by each of any by combinations of terms defined in the query.

For each time interval that overlaps the query identify time interval, the query AST for the time interval is evaluated (block 320 which may include operations of block 312)) based on the merged Bloom filters for the time interval. If the query AST indicates that no records having time periods that overlap the query identify time interval contain a defined one of the terms or the defined logical combination defined in the search query, the operations then proceed to process (block 322) the next time interval.

Otherwise if records are indicated to exist by the query AST, operations are performed to generate (block 324) an estimate for the number of record items that would be returned by the defined one of the terms or the defined logical combination if that portion of the query were performed as a full text query of the records. Example operations that can be performed to generate (block 324) the estimate are described below.

In one embodiment, the estimate can be modified (block 326) based on an amount of overlap between the time interval associated with a record and time interval identified by the query. For example, if the time interval of the record only partially overlaps the query identify time interval, the estimate is generated for the time interval identified by the query can be reduced based on the amount of overlap. In a particular nonlimiting embodiment, the estimate can be reduced based on a percentage of the overlap.

Estimates that been generated (block 324), and which may be modified (block 326 based on overlap of time intervals, are combined (block 328), e.g. added, for all time intervals that overlap the query identify time interval. The operations of block 316 are repeated for other unique terms in the query and/or any other logical combinations of the terms defined in the query.

A message is returned (block 330) to the user equipment 150 that includes the estimates, and which may further include the query AST. The message can therefore indicate as estimate of the number of record items (e.g., rows) that would be returned if a full search of the records were performed for, or that would otherwise correspond to, each of the terms defined by the query and/or for each of the logical combinations of terms defined by the query.

Generating Estimates for a Time Interval

Histograms, MinHashes, and bit-arrays can be used to provide estimates of the number of record items that would be returned by individual terms in a query, by groups of terms in a query, and/or by the entire query if the query were performed as a full text query of the records, in accordance with some embodiments disclosed herein. For example, these operations may be used in block 322 of FIG. 3 to generate the estimate of the number of record items for the time interval or other defined range.

The operations for generating estimates of the number of record items using a histogram can use a relatively low amount of computational resources and be performed quickly. As explained above, the histogram contains defined ranges (e.g., time interval), and for each range, the histogram captures two counts: 1) the number of unique terms in the range; and 2) the total number of occurrences of all those terms in the range. A uniform distribution of occurrence of the terms may be assumed within each range in the histogram. For example, if a range is determined to contain 10 unique terms and a count of 50 total number of occurrences, each unique term is assumed to have an estimate of 5.

Various of the following operations may be used by the search engine 140 to determine the estimates when the terms are combined using Boolean or other logic associations in a received query. A term here can also represent an internal node in the query AST, so the estimation can be performed bottom-up for the query AST.

Example operations are provided below for generating an estimate of how many content items (e.g., rows) will be returned from unary operations and binary Boolean logic combination of terms identified by a search query for two terms (TermA, TermB).

1, TermA and TermB
  Estimate (TermA and TermB)=Min (Estimate (TermA), Estimate (TermB))
  For example, when TermA is determined from the histogram to occur 100 times in one of the ranges identified by the query and TermB is determined to occur 1000 times in the range, a query containing the combination of TermA and TermB is estimated to retrieve 100 record items in the range.
2. TermA or TermB
  Estimate (TermA or TermB)=Estimate (TermA)+Estimate (TermB)
  For example, when TermA is determined from the histogram to occur 100 times in one of the ranges identified by the query and TermB is determined to occur 1000 times in the range, a query containing the combination of TermA or TermB is estimated to retrieve 1100 record items in the range.
3. not TermA
  Estimate not TermA)=Total record count−Estimate (TermA)
  For example, when TermA is determined from the histogram to occur 100 times in one of the ranges identified by the query and the total count of records in the range is 1000 times, a query containing the logic not TermA is estimated to retrieve 900 record items in the range.

Although the histogram can be used to provide a fast low computationally intensive estimate, the histogram based estimate does not provide information regarding correlations between the terms. For example, for (TermA and TermB), TermA and TermB may never occur together in the same log record and hence the estimate Min(Estimate (TermA), Estimate (TermB)) will be inaccurate. In accordance with some present embodiments, MinHash is used to determine the overlap between two sets (where each set is the set of log records where a term occurs). MinHash values of the terms are combined and used as a similarity factor to adjust the estimates, A NULL MinHash indicates that the term occurs in a majority of the records.

Example operations are provided below for using a combination of the histogram operations and MinHash operations to generate an estimate of how many content items (e.g., rows) will be returned from unary operations and binary Boolean logic operations and combination of terms identified by a query. In the present non-limiting example an estimate is generated for three different defined Boolean logic combinations that may be identified in a query for two terms (TermA, TermB).

1. TermA and TermB
  i. When at least one MinHash of TermA or TermB is NULL,
    Estimate (TermA and TermB)=Min (Estimate (TermA), Estimate (TermB)), computed as explained above using the histogram,
    Perform MinHash (TermA and TermB)=(MinHash (TermB) is NULL)? MinHash(TermA) MinHash (TermB)
  ii. When both MinHash values are present,
    Estimate (TermA and TermB)
      1. X=Estimate(TermA)+Estimate(TermB)
      2. Y=Correlation fraction from MinHash(TermA) and MinHash(TermB)
      3. Estimate (TermA and TermB)=X*Y/(1+Y)
    Perform MinHash (TermA and TermB)
      1. For each hash function H,
        a. If the values in both MinHashes for H match then copy the value to the result
        b, otherwise return NULL.
2. TermA or TermB
  i. When at least one MinHash of TermA or TermB is NULL,
    Estimate (TermA or TermB)=Estimate (TermA)+Estimate (TermB), computed as explained above using the histogram,
    MinHash (TermA or TermB)=NULL
  ii. When both MinHash values are present,
    Estimate (TermA or TermB)
      1. X=Estimate(TermA)+Estimate(TermB)
      2. Y=Correlation fraction from MinHash(TermA) and MinHash(TermB)
      3. Estimate (TermA or TermB)=X*(1−Y)/(1+Y)
    Perform MinHash (TermA or TermB)
      1. For each hash function H,
        a. Pick the minimum for that hash in the two MinHashes
3. not TermA
  i. Estimate (not TermA)=Total record count−Estimate (TermA), computed as explained above using the histogram,
    MinHash (not TermB)=NULL Bit-arrays can be generated and stored for terms satisfying defined conditions (e.g., highly selective). Since bit-arrays keep track of the exact records where the terms occur, they not only help to get more precise correlations than MinHashes but also provide actual counts of the result set. When generating an estimate responsive to a query, if a bit-array exists for the defined range (or time interval) it is used to generate a more precise estimate.

Example operations are provided below for selecting among using histogram values, MinHash values, and/or bit-array values, that can be earlier generated by processing of log streams as described above, to generate estimates of how many content items (e.g., rows) will be returned from unary and binary Boolean logic operations and combination of terms identified by a query. In the present non-limiting example an estimate is generated for three different defined Boolean logic combinations that may be identified in a query for two terms (TermA, TermB).

1. TermA and TermB
  i. When one of the bit-arrays of TermA and TermB is not NULL and the other is NULL (i.e., when the bit-array for one of the terms has been generated and stored such as described above and no bit-array has yet been generated and stored for the other term),
    Bit-Array (TermA and TermB)=(Bit-Array (TermB) is NULL)? Bit-Array (TermA): Bit-Array (TermB)
    Generate estimate (TermA and TermB)=Count from Bit-Array (TermA and TermB)
  ii. When both bit-arrays have been generated and stored,
    Bit-Array (TermA and TermB)=AND (Bit-Array (TermA), Bit-Array (TermB))

Generate estimate (TermA and TermB)=Count from Bit-Array (TermA and TermB)
iii. When both bit-arrays are NULL (i.e., no bit-array for either term has yet been generated and stored), generate estimate using histogram and/or MinHash (e.g., use MinHash values if stored otherwise use histogram values).
2. TermA or TermB
i. When at least one bit-array of TermA or TermB is NULL, generate estimate either from Histograms or MinHashes (e.g., use MinHash values if stored otherwise use histogram values),
Bit-Array (TermA or TermB)=NULL
ii. When both bit-arrays are present,
Bit-Array (TermA or TermB)=OR (Bit-Array (TermA), Bit-Array (TermB))
Generate estimate (TermA or TermB)=Count from Bit-Array (TermA or TermB)
3. not TermA—generate estimate either from Histogram or MinHash (e.g., use MinHash values if stored otherwise use histogram values).

Although operations have been explained above for generating estimates of how many content items (e.g., rows) will be returned from unary and binary Boolean logic operations and combination of terms identified by a query, the operations disclosed herein can be extended to a strings of logic operations and combinations of terms (e.g., TermA and TermB and TermC and TermD).

The search engine 140 returns a message to the user equipment 150 that identifies the estimates of how many content items (e.g., rows) would be returned if the full text query is performed on the log stream(s) in the log repository 110 that are associated with identifier(s) in the query. The user equipment 150 displays information based on the estimates to an operator who generated the search query to enable the operator to understand the distribution of relevant terms in the log repository 110 and identify which of the terms and/or logic combinations of terms provided in the search query should be eliminated or modified to retrieve an acceptable number of items (e.g., rows) of the log records. It is noted that the operator obtains this understanding of how to modify the query without incurring the overhead of actually performing the full text or other search.

The estimates can additionally or alternatively be used to improve the operational/computational efficiency of the full text search. The search engine 140 may select which terms or logical combination of terms should be used for a full text search of the records before other terms or logical combinations of terms are used to search among the results of the earlier search in order to more efficiently narrow search operations through the records. For example, suppose a search is for "TermA and TermB and TermC", and the estimates for TermA and TermC are far lower than the estimate for TermB. The search engine 140 may substantially decrease the computational resources that are used to complete the search by performing a search using "TermA and TermC" first and then searching among the result thereof using TermB.

Example Log Stream Analysis Computer

Figure 4:
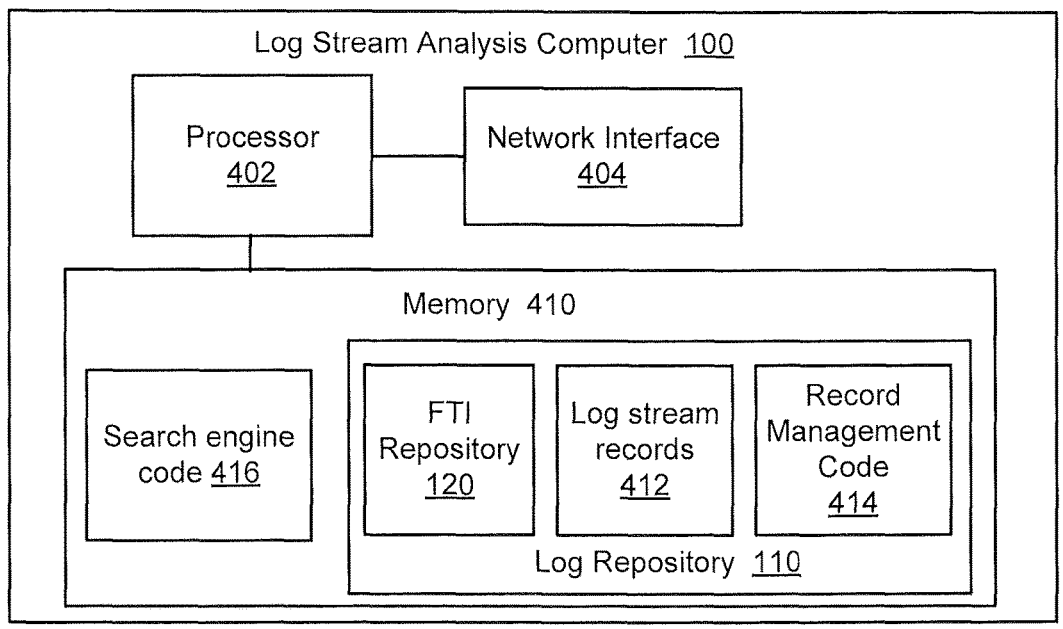
FIG. 4 is a block diagram of a log stream analysis computer configured according to some embodiments.

FIG. 4 is a block diagram of the log stream analysis computer 100 or a component thereof of FIG. 1 configured according to one embodiment. Referring to FIG. 4, a processor 402 may include one or more data processing circuits, such as a general purpose and/or special purpose processor (e.g., microprocessor and/or digital signal processor) that may be collocated or distributed across one or more networks. The processor 402 is configured to execute computer readable program code in a memory 410, described below as a computer readable medium, to perform some or all of the operations and methods disclosed herein for one or more of the embodiments. The program code can include search engine code 416 that is configured to perform one or more of the embodiments disclosed herein as being performed by the search engine 140. The program code can include record management code 414 that manages receipt, partitioning, storage of records, and/or deletion of records. The memory 410 can include storage for the FTI repository 120 and the log stream records 412. Although a single memory block 410 has been illustrated for simplicity, it is to be understood that any number, combination of types, and hierarchy of memory storage devices (e.g., solid state, disk drive, etc.) can be used. A network interface 404 can communicatively connect the processor 402 to the host machine nodes 10 and user equipment 150 shown in FIG. 1.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a computer in communication with one or more network host machines of a data network, the method comprising:
   receiving a search query from a user equipment in communication with the computer, the search query defining a set of a plurality of logical combination of terms to be searched within a defined interval of records of a log stream received from the one or more network host machines of the data network;
   for each of the logical combinations of terms in the set, generating an estimate for the number of occurrences of the logical combination of terms in the defined interval of records using information of one of a bit-array data structure, a min-wise independent permutation locality sensitive hashing (MinHash) data structure, and a histogram data structure characterizing occurrences of a unique term contained within the defined interval of records of the log stream, wherein the unique term is one of the terms in the set of the plurality of logical combination of terms defined by the search query;

communicating toward the user equipment a message containing the estimate for the number of occurrences for each of the logical combination of terms in the set within in the defined interval of records;

obtaining a selection of at least one logical combination of terms from the set of the plurality of logical combination of terms based on the generated estimate of the at least one logical combination of terms; and modifying the search query using the selected at least one logical combination of terms; and performing the modified search query against the defined interval of records of the log stream to obtain a modified search query result set.

2. The method of claim 1, further comprising:
for each unique term occurring in the record corresponding to the interval, generating an estimate for the number of occurrences of the unique term in the defined interval of records; and
including in the message communicated toward the user equipment the estimates for the number of occurrences of each unique term in the defined interval of records.

3. The method of claim 1, further comprising:
partitioning each of a plurality of log streams into a sequence of records having corresponding intervals; and for each of the intervals, performing:
determining a number of times the unique term occurs in one or more records of the log streams corresponding to the interval;
selecting, based on the number of times, one of a plurality of different types of operations that the computer is configured to perform to characterize occurrences of terms in a record; and
generating the information of the one of a bit-array data structure, a min-wise independent permutation locality sensitive hashing (MinHash) data structure, and a histogram data structure characterizing occurrences of the unique term in the one or more records of the log streams corresponding to the interval using the selected one of the plurality of different types of operations.

4. The method of claim 3, further comprising:
repeating the determining, the selecting, and the generating for each unique term occurring in the one or more records of the log streams corresponding to the interval,
wherein the generating the estimate for the number of occurrences of the logical combination of terms in the defined interval of records for each of the logical combinations of terms in the set uses the information of the one of a bit-array data structure, a min-wise independent permutation locality sensitive hashing (MinHash) data structure, and a histogram data structure characterizing occurrences of each unique term among the terms in the logical combination of terms defined by the search query.

5. The method of claim 4, wherein selecting, based on the number of times, one of a plurality of different types of operations that the computer is configured to perform to characterize occurrences of terms in a record, comprises:

based on the number of times satisfying a first threshold, using the bit-array data structure as the information characterizing occurrences of the selected one of the terms in the one or more records of the log streams corresponding to the interval; and based on the number of times satisfying a second threshold that is different than the first threshold, using the min-wise independent permutation locality sensitive hashing (MinHash) data structure as the information characterizing occurrences of the selected one of the terms in the one or more records of the log streams corresponding to the interval.

6. The method of claim 5, wherein:
the first threshold is smaller than the second threshold;
satisfying the first threshold occurs when the number of times is smaller than the first threshold; and
satisfying the second threshold occurs when the number of times is smaller than the second threshold.

7. The method of claim 5, wherein selecting, based on the number of times, one of a plurality of different types of operations that the computer is configured to perform to characterize occurrences of terms in a record, further comprises:

based on the number of times not satisfying the first threshold and not satisfying the second threshold, using the histogram data structure indicating distribution of terms in the records as the information characterizing occurrences of the selected one of the terms in the one or more records of the log streams corresponding to the interval.

8. The method of claim 4, further comprising:
identifying records having corresponding intervals that overlap the defined interval from the search query; and
for each of the logical combination of terms in the set defined by the search query, generating the estimate for the number of occurrences of the logical combination of terms in the records having corresponding intervals that overlap the defined interval from the search query.

9. The method of claim 8, wherein:
at least two of the log streams are partitioned into sequences of records having different size intervals; and
identifying records having corresponding intervals that overlap the defined interval from the search query identifies a plurality of records of different ones of the log streams that overlap the defined interval from the search query.

10. The method of claim 3, further comprising:
generating a Bloom filter data structure providing a probabilistic indication of whether terms are contained in identified ones of the records; and
controlling based on the Bloom filter data structure which of the records are searched when determining the number of times a unique term occurs in the records of the log streams corresponding to the interval.

11. A computer program product configured to communicate with one or more network host machines of a data network, the computer program product comprising:
a non-transitory computer readable storage medium of a computer in communication with the one or more network host machines, the non-transitory computer readable storage medium having computer readable program code embodied therewith, the computer readable program code comprising:
computer readable program code to receive a search query from a user equipment in communication with the computer, the search query defining a set of a plurality of logical combination of terms to be searched within a defined interval of records of a log stream received from the one or more network host machines of the data network;

computer readable program code to generate, for each of the logical combinations of terms in the set, an estimate for the number of occurrences of the logical combination of terms in the defined interval of records using information of one of a bit-array data structure, a min-wise independent permutation locality sensitive hashing (MinHash) data structure, and a histogram data structure characterizing occurrences of a unique term contained within the defined interval of records of the log stream, wherein the unique term is one of the terms in the set of the plurality of logical combination of terms defined by the search query;

computer readable program code to communicate toward the user equipment a message containing the estimate for each of the number of occurrences of the logical combination of terms in the set within in the defined interval of records;

computer readable program code to obtain a selection of at least one logical combination of terms from the set of the plurality of logical combination of terms based on the generated estimate of the at least one logical combination of terms;

computer readable program code to modify the search query using the selected at least one logical combination of terms; and computer readable program code to perform the modified search query against the defined interval of records of the log stream to obtain a modified search query result set.

12. The computer program product according to claim 11, wherein the computer readable program code further comprises:

computer readable program code to, for each unique term occurring in the record corresponding to the interval, generate an estimate for the number of occurrences of the unique term in the defined interval of records; and computer readable program code to include in the message communicated toward the user equipment the estimates for the number of occurrences of each unique term in the defined interval of records.

13. The computer program product according to claim 11, wherein the computer readable program code further comprises:

computer readable program code to partition each of a plurality of log streams into a sequence of records having corresponding intervals; and computer readable program code to, for each of the intervals, perform:

determining a number of times the unique term occurs in one or more records of the log streams corresponding to the interval;

selecting, based on the number of times, one of a plurality of different types of operations that the computer is configured to perform to characterize occurrences of terms in a record; and generating the information of the one of a bit-array data structure, a min-wise independent permutation locality sensitive hashing (MinHash) data structure, and a histogram data structure characterizing occurrences of the unique term in the one or more records of the log streams corresponding to the interval using the selected one of the plurality of different types of operations.

14. The computer program product according to claim 13, wherein the computer readable program code further comprises:

computer readable program code to repeat the determining, the selecting, and the generating for each unique term occurring in the one or more records of the log streams corresponding to the interval, wherein the generating the estimate for the number of occurrences of the logical combination of terms in the defined interval of records for each of the logical combinations of terms in the set uses the information of the one of a bit-array data structure, a min-wise independent permutation locality sensitive hashing (MinHash) data structure, and a histogram data structure characterizing occurrences of each unique term among the terms in the logical combination of terms defined by the search query.

15. The computer program product according to claim 14, wherein selecting, based on the number of times, one of a plurality of different types of operations that the computer is configured to perform to characterize occurrences of terms in a record, comprises:

based on the number of times satisfying a first threshold, using the bit-array data structure as the information characterizing occurrences of the selected one of the terms in the one or more records of the log streams corresponding to the interval; and based on the number of times satisfying a second threshold that is different than the first threshold, using the min-wise independent permutation locality sensitive hashing (MinHash) data structure as the information characterizing occurrences of the selected one of the terms in the one or more records of the log streams corresponding to the interval.

16. The computer program product according to claim 15, wherein:

the first threshold is smaller than the second threshold;

satisfying the first threshold occurs when the number of times is smaller than the first threshold; and satisfying the second threshold occurs when the number of times is smaller than the second threshold.

17. The computer program product according to claim 15, wherein selecting, based on the number of times, one of a plurality of different types of operations that the computer is configured to perform to characterize occurrences of terms in a record, further comprises:

based on the number of times not satisfying the first threshold and not satisfying the second threshold, using the histogram data structure indicating distribution of terms in the records as the information characterizing occurrences of the selected one of the terms in the one or more records of the log streams corresponding to the interval.

18. The computer program product according to claim 14, wherein the computer readable program code further comprises:

computer readable program code to identify records having corresponding intervals that overlap the defined interval from the search query; and computer readable program code to, for each of the logical combination of terms in the set defined by the search query, generate the estimate for the number of occurrences of the logical combination of terms in the records having corresponding intervals that overlap the defined interval from the search query.

* * * * *